United States Patent [19]

Landgren

[11] Patent Number: 6,115,754

[45] Date of Patent: *Sep. 5, 2000

[54] SYSTEM AND METHOD FOR APPENDING LOCATION INFORMATION TO A COMMUNICATION SENT FROM A MOBILE TERMINAL OPERATING IN A WIRELESS COMMUNICATION SYSTEM TO AN INTERNET SERVER

[75] Inventor: Patricia A. Landgren, Plano, Tex.

[73] Assignee: Nortel Networks Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/999,291

[22] Filed: Dec. 29, 1997

[51] Int. Cl.$^7$ .................................................. G06F 15/16
[52] U.S. Cl. ......................... 709/249; 709/249; 709/236
[58] Field of Search .................................... 709/216, 218, 709/236, 249; 455/422, 435, 436, 440, 456; 370/331, 334, 401, 402; 340/988

[56] References Cited

U.S. PATENT DOCUMENTS

| | | | |
|---|---|---|---|
| 5,159,592 | 10/1992 | Perkins | 370/338 |
| 5,629,693 | 5/1997 | Janky | 340/988 |
| 5,635,940 | 6/1997 | Hickman et al. | 342/385 |
| 5,732,216 | 3/1998 | Logan et al. | 709/203 |
| 5,774,826 | 6/1998 | McBride | 701/207 |
| 5,790,800 | 8/1998 | Gauvin et al. | 709/227 |
| 5,835,530 | 11/1998 | Hawkes | 375/225 |
| 5,838,926 | 11/1998 | Yamagishi | 709/249 |
| 5,862,339 | 1/1999 | Bonnaure et al. | 709/227 |
| 5,999,816 | 12/1999 | Tiedemann, Jr. et al. | 455/437 |
| 6,016,318 | 1/2000 | Tomoike | 370/401 |
| 6,041,355 | 3/2000 | Toga | 709/227 |

Primary Examiner—Zarni Maung
Assistant Examiner—Jason D. Cardone
Attorney, Agent, or Firm—Bruce E. Garlick; James A. Harrison

[57] ABSTRACT

A location appending system appends location information concerning a mobile unit to a communication passing through a gateway between a wireless network and the Internet, the communication sent by the mobile unit. The location appending system includes a gateway interface, an Internet request parsing unit, a location determination unit and a wireless network interface. The gateway interface allows the location parsing system to operate in conjunction with the gateway. The Internet request parsing unit parses communications passing through the gateway and determines which of the communications require location information. The location determination unit identifies the associated mobile unit and produces a locate request that includes the identity of the mobile unit. The wireless network interface forwards the locate request to the wireless network receives a locate response from the wireless network. The location determination then determines the location information based upon the locate response. Then, either the location appending system or gateway appends the location information to the communication. The location appending system may include a database that couples to the location determination unit which contains cross-reference information that is used by the location determination unit in determining the location information. The location information may include a zipcode corresponding to a current location of the mobile unit, longitude and latitude information corresponding to a current location of the mobile unit or other location specific information. The communication may comprise markup language.

36 Claims, 10 Drawing Sheets

SYSTEM AND METHOD FOR APPENDING LOCATION INFORMATION TO A COMMUNICATION SENT FROM A MOBILE TERMINAL OPERATING IN A WIRELESS COMMUNICATION SYSTEM TO AN INTERNET SERVER

BACKGROUND

1. Technical Field

The present invention relates generally to the up-link and down-link of communications between a wireless network and the Internet, and more particularly to a system and associated method of operation for appending location information regarding a mobile unit to communications sent from the mobile unit operating in a wireless network to a server coupled to the Internet.

2. Related Art

As communications via the Internet have progressed over time, various standards have emerged which attempt to define the manner in which information is transferred over the Internet. These standards define not only the communication mechanisms employed but also the format in which the information is packaged, how information is routed based upon its content and how it is interpreted upon receipt. Examples of communication standards that have been developed specifically for the Internet include the Transfer Control Protocol/Internet Protocol (TCP/IP) and the HyperText Transfer Protocol (HTTP). Further, examples of standards that define communication content, organization and structure include the Hypertext Markup Language (HTML) and the Handheld Device Markup Language (HDML), among other standards.

HTTP provides for the delivery of Uniform Resource Identifiers (URIs) from clients to servers and the delivery of text files from servers to clients and is part of the TCP/IP protocol suite. HTTP is an application-level protocol for distributed, collaborative, hypermedia information systems and has been in use by the World-Wide Web global information initiative since 1990. HTTP allows an open-ended set of methods that indicate the purpose of a request. It builds on the discipline of reference provided by the URI as a Uniform Resource Location (URL) or Uniform Resource Name (URN), for indicating the resource to which a method is to be applied. Messages are passed in a format similar to that used by Internet mail as defined by the Multipurpose Internet Mail Extensions (MIME). HTTP is also used as a generic protocol for communication between user agents and proxies/gateways to other Internet systems, including those supported by the SMTP, NNTP, FTP, Gopher, and WAIS protocols. In this way, HTTP allows basic hypermedia access to resources available from diverse applications.

Content delivered from HTTP servers (also known as Web servers) to Web browsers is delivered in HTML format. HTML describes how a page is to appear in a device-independent manner. Individual devices interpret the HTML and choose how to best display it, given the restrictions of the local environment. The lowest common denominator for HTML was originally specified to be a VT-100 class terminal with an 80-character wide, continuously scrolling display plus a random access pointing device such as a mouse. Today, most Web content requires a more sophisticated browser that can display bit-mapped graphics, run Java programs and execute Shockwave multimedia presentations. HTML does not scale well to small displays and mouseless user interfaces, and is a practical impossibility for delivering information to handheld devices with size, memory and cost constraints.

HDML is a simple language used to define hypertext-like content and applications for mobile units with small displays. HDML is designed to leverage the infrastructure and protocols of the World Wide Web while providing an efficient markup language for wireless and other handheld devices. Congruent with the capabilities and limitations of many handheld devices, HDML's focus goes beyond presentation and layout. HDML provides an explicit navigation model which does not rely upon the visual context required of HTML. As such, HDML offers an efficient means of providing content via the WWW infrastructure to handheld devices such as cellular phones, pagers, and wireless PDA's.

HDTP is an open and freely available protocol specification developed and contributed to the industry by Unwired Planet. HDTP enables any cellular, PCS, or paging network to provide Internet information access from standard handheld devices. HDTP operates with industry standards such as TDMA, CDMA, TCP/IP, UDP/IP, GSM and SMS, and incorporates industry standard encryption algorithms for secure transactions. HDTP is optimized for wireless networks, where the HTTP protocol is not usable due to network latency and throughput. HDTP brings direct Internet information access to wireless networks, regardless of the type of data transport provided. In networks combining multiple protocols, such as SMS, circuit data, or packet data, HDTP allows applications to use the most effective and cost-efficient path to send data to the device's screen.

Devices within a wireless network typically operate according to HDTP/HDML standards. However, devices on the Internet comply the HTTP/HTML standards. Thus, a gateway between the wireless network and the Internet is required to reformat communications passing between the two. As constructed, the gateway supports HDML/HDTP on a side connected to the wireless network and HDML/HTTP on a side connected to the Internet and repackages/reformats communications passing through as appropriate. However, in other applications, the gateway supports HTML/HTTP on a side connected to the wireless network.

In many Internet applications supported by an Internet server, the location of a client is important. For example, a client of a mapping system application provides map information and other services based upon the assumed location of a client. When the client is stationary, the application receives location information a single time by either querying the client or by cross-referencing the IP address of the client to known zipcode locations. Once the location is known, the application proceeds according to the known information.

The mobility of mobile units operating in a wireless network causes problems when the mobile units serve as a client to an Internet based application. In their normal operation, the mobile unit travel over large geographic areas, passing not only from zipcode to zipcode but often from county to county and state to state. In some installations, the mobile unit always accesses the Internet via a single gateway, a gateway IP address ostensibly providing some indication of location of the mobile unit. But, even though the location of the gateway is known, the mobile unit may be a large distance from the gateway visiting in another area. Further, in other installations, the mobile unit accesses the Internet via differing gateways, the selection of which depends upon its operating location.

Thus, there exists a need in the art for a system and method of operation that allows an application operating upon an Internet server to determine a mobile unit's position.

SUMMARY OF THE INVENTION

Thus, to overcome the limitations identified above as well as other limitations in prior systems, a location appending system constructed according to the present invention produces location information that is appended to a communication passing through a gateway between a wireless network and the Internet. The location information indicates the location of a mobile unit operating within the wireless network that sent the communication. The location appending system includes a gateway interface, an Internet request parsing unit, a location determination unit and a wireless network interface.

The gateway interface couples to the gateway and allows the location parsing system to operate in conjunction with the gateway. The Internet request parsing unit couples to the gateway interface and parses communications passing through the gateway from the wireless network to the Internet. In parsing the communications, the Internet request parsing unit determines which of the communications require location information. When the Internet request parsing unit determines that a particular communication requires location information, the location determination unit identifies the associated mobile unit and produces a locate request that includes the identity of the mobile unit.

The wireless network interface couples the location determination unit to the wireless network and forwards the locate request to the wireless network. The wireless network processes the locate request and returns a locate response to the wireless network interface which forwards the locate response to the location determination unit. The location determination then determines the location information based upon the locate response. In one embodiment, the location appending system appends the location information to the communication. However, in another embodiment, the gateway appends the location information to the communication.

The location appending system may include a database that couples to the location determination unit which contains cross-reference information that is used by the location determination unit in determining the location information. The location information may include a zipcode corresponding to a current location of the mobile unit, longitude and latitude information corresponding to a current location of the mobile unit or other location specific information.

Operation in determining the location information depends upon construction of the wireless network. Disclosed structures for the wireless network include those compliant with the Cellular Digital Packet Data standard, those compliant with the Global System for Mobile communications standard and those compliant with North American Cellular standards. In any construction, the communication may be compliant with either HDTP or HTTP. In the construction, the location information is appended to the communication prior to its transmission upon the Internet by the gateway.

A method of operation according to the present invention operates consistently with the described structure. In the method, a first step includes receiving communications from the wireless network. Next, the method includes parsing the communications to determine that a communication requires location information. Then, the method includes identifying a mobile unit that transmitted the communication. A locate request is then produced for the identified mobile unit and forwarded to the wireless network. The wireless network produces a locate response which is then used to determine the location information. The location information is then appended to the communication.

Moreover, other aspects of the present invention will become apparent with further reference to the drawings and specification which follow.

DETAILED DESCRIPTION OF THE DRAWINGS

Figure 1A:
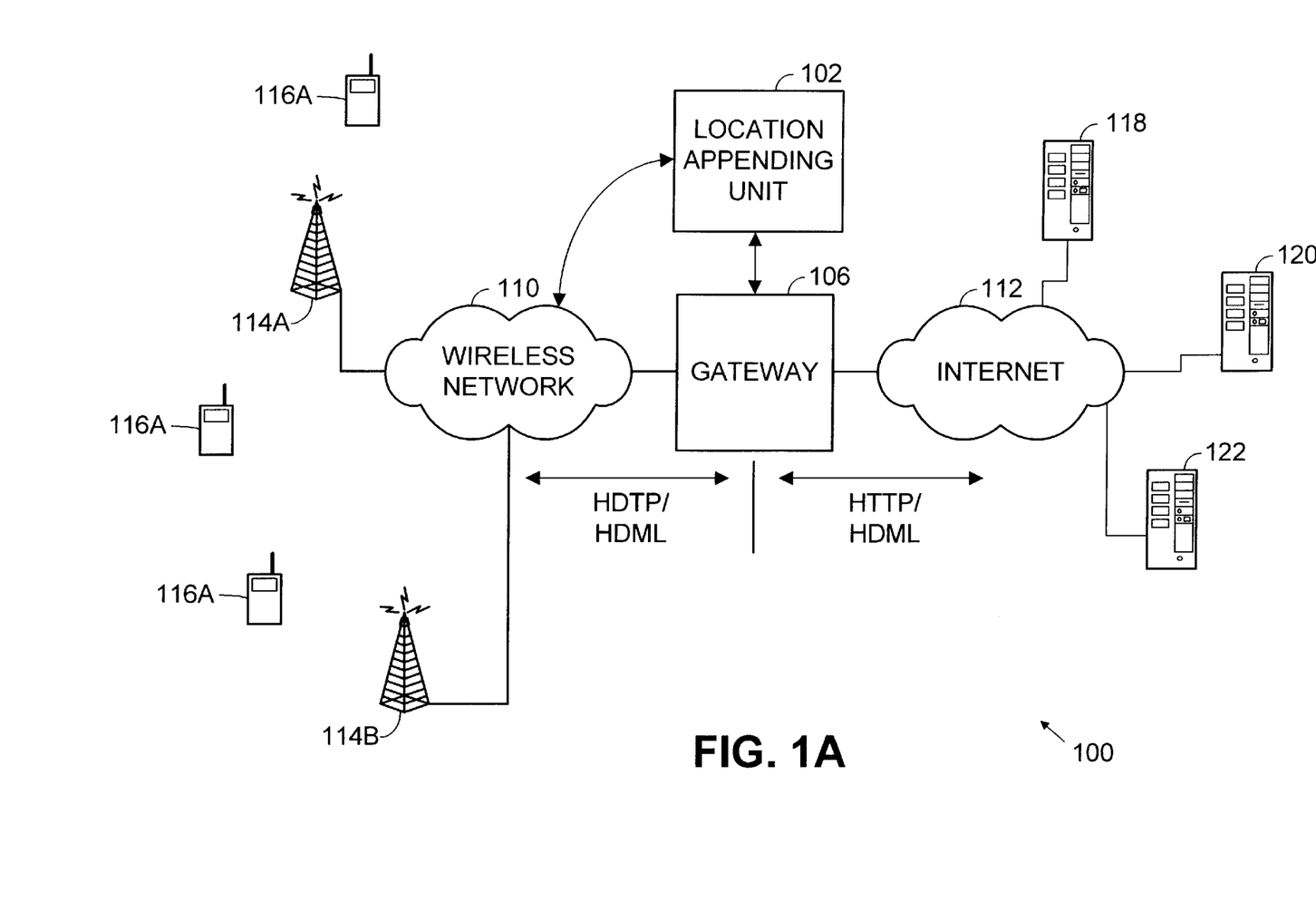
FIG. 1A is a diagram illustrating an installation of a location appending unit constructed according to the present invention, the location appending unit is coupled to a gateway that locates a wireless network and the Internet.

FIG. 1A illustrates an installation 100 of a location appending unit 102 constructed according to the present invention. As shown, the installation 100 includes a wireless network 110 that is coupled to the Internet 112 via a gateway 106. The wireless network 110 includes a significant infrastructure, only a portion of which is illustrated in FIG. 1A. Components of the wireless network 110 shown are base transceiver stations 114A and 114B that facilitate wireless communications within respective cells. As shown, mobile units 116A, 116B and 116C may operate within the area served by the wireless network 110.

The wireless network 110 connects to the Internet 112 via the gateway 106. The gateway 106 serves to convert communications as they pass between the wireless network 110 and the Internet 112. Coupled to the Internet 112 are web servers 118, 120 and 122 that support communications via the Internet 112. Each of the mobile units 116A, 116B and 116C supports communication with the Internet via compatible languages and protocols.

One particular protocol supported by the wireless network 110 is the Handheld Device Transport Protocol (HDTP) while one particular language supported is the Handheld Device Markup Language (HDML). The Internet 112 supports the Hypertext Transport Protocol (HTTP) and HDML for communications between the mobile units 116A, 116B and 116C and the web servers 118, 120 and 122. However, as is known, the Internet 112 also supports communications in the Hypertext Markup Language (HTML). The gateway 106, among other operations in facilitating communication between the Internet 112 and the wireless network 110, converts communications between HDTP and HTTP, the gateway 106 supporting communications according to HTTP on its Internet 112 connection and according to HDTP on its wireless network 110 connection.

Some applications run by one or more of the web servers 118, 120 and 122 interact with one or more of the mobile units 106A–106C. Some of these applications may require specific information relating to the location of the mobile units 106A–106C. For example, web server 118 may be in communication with mobile unit 106C, providing mapping services to the mobile unit 106C. To provide specific information requested by the mobile unit 106C for the mapping service application, the web server 118 must know the precise location of the mobile unit 106C. Heretofore, the web server 118 could not determine the location of the mobile unit 106C.

The location appending unit 102 monitors ongoing communications passing through the gateway 106. When communications requiring location information pass through the gateway 106, the location appending unit 102 detects the requirement for appending information, determines the location information required and appends the location information to the communications. Location information includes, for example, the zipcode in which a respective mobile unit currently operates and the current longitude and latitude of the position of the mobile unit, for example. After the location information is appended, the gateway 106 passes the communication to the Internet 112 for delivery to the destination web server.

In determining the location of a respective mobile unit, the location appending unit 102 interacts with the wireless network 110. Such interaction is dependent upon the particular construction of the wireless network 110 and will be further described herein. However, in general, the location appending unit 102 interacts with the wireless network 110 using available network resources to query wireless network 110 components to request that the location information be returned. Specific installations according to particular wireless network architectures will be further described herein.

In an example of operation of the location appending unit 102, an application operating on web server 118 registers with the location appending unit 102, requesting the location appending unit 102 to intercept all communications passing through the gateway 106 that include a particular Uniform Resource Identifier (URI), the URI perhaps specific to an HTML page located on the web server 118. In the registration request, the application requires that longitude and latitude information be appended to the communication including the particular URI. In further operations, the location appending unit 102, upon identifying a communication with the registered URI, intercepts the communication, appends location information and then allows the gateway 106 to forward the communication.

In another operation, the location appending unit 102 identifies communications that include requested location information. Upon recognizing the communication, the location appending unit 102 determines the location information and appends the communication with the location information.

Figure 1B:
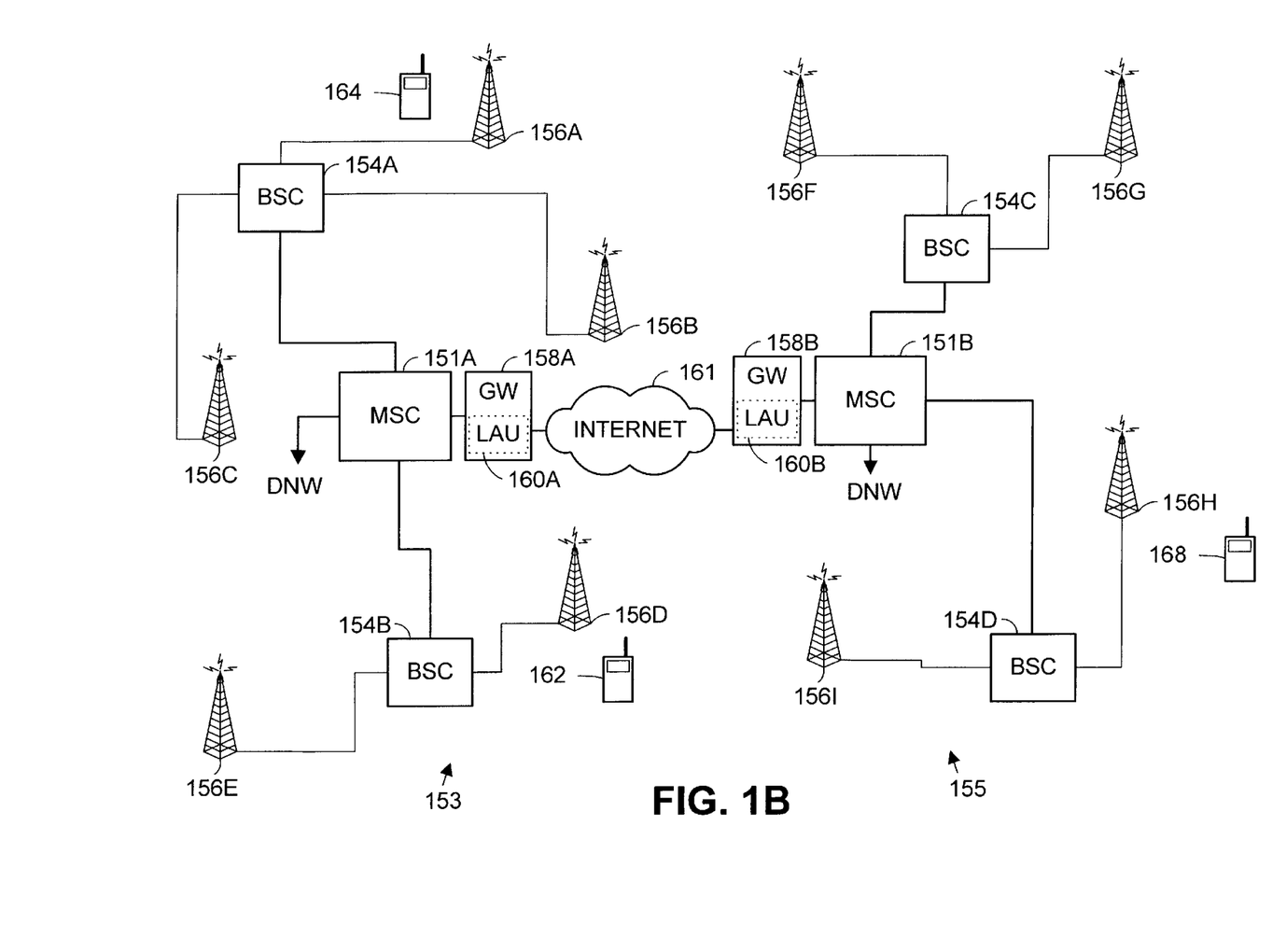
FIG. 1B is a diagram illustrating an alternate installation of a location appending unit constructed according to the present invention wherein the location appending unit resides within a gateway between a wireless network and the Internet.

FIG. 1B illustrates a different installation of location appending units 160A and 160B constructed according to the present invention. As shown, the location appending units 160A and 160B are located within gateways 158A and 158B, respectively. Two wireless networks are shown, 153 and 155, each of which includes components consistent with the GSM and NAM standards. A first wireless network 153 includes mobile switching center (MSC) 151A, base station controllers (BSCs) 154A and 154B and base transceiver stations (BTSs) 156A, 156B, 156C, 156D and 156E. A second wireless network 155 includes MSC 151B, BSCs 154C and 154C and BTSs 156F, 156G, 156H and 156I.

Gateway 158A provides an interface between MSC 151A and the Internet 161 while gateway 158A provides an interface between MSC 151B and the Internet 161. The gateways 158A and 158B convert communications between formats that are consistent with the Internet 161 and formats that are compatible with the wireless networks. For example, as was discussed with reference to FIG. 1A, the Internet is compatible with HTTP/HTML while the wireless communication systems are compatible with HDTP/HDML or HTTP/HTML.

Mobile units operating in areas served by the wireless networks 153 and 155 may support communications with web servers coupled to the Internet 161. Some of these applications may require location information for the mobile units. Thus, the location appending units 160A and 160B append location information to communications passing through the gateways 160A and 160B. However, as was the case with the installation 100 of FIG. 1A, the location appending units 160A and 160B of FIG. 1B may be required to append location information to units visiting other wireless networks. For example, mobile unit 162 is visiting the wireless network 153 served by MSC 151A. Thus, communications between the Internet 161 and the mobile unit 164 are routed via gateway 158A, perhaps from MSC 151A to MSC 151B via a dedicated network (DNW) such as an IS-41 network. Likewise, should mobile unit 168 be visiting the wireless network 155 served by MSC 151B, communications to the Internet 161 from mobile unit 168 may be routed via gateway 158A.

When a communication passes through the gateway 158A sent from mobile unit 162 operating within the wireless network 153 that requires location information to be appended, the location appending unit 160A first identifies the mobile unit 162. Then, the location appending unit 160A seeks location information for mobile unit 162. In determining the location information, the location appending unit 160A must interface with the wireless network 153 to determine the location information. Should the mobile unit 162 be visiting from wireless network 155, the location appending unit 158A must access both wireless network 153 and wireless network 155. Wireless networks 153 and 155 then, in combination, determine the location information and provide the location information to the location appending unit 160A which appends the location information to the communication.

Figure 2A:
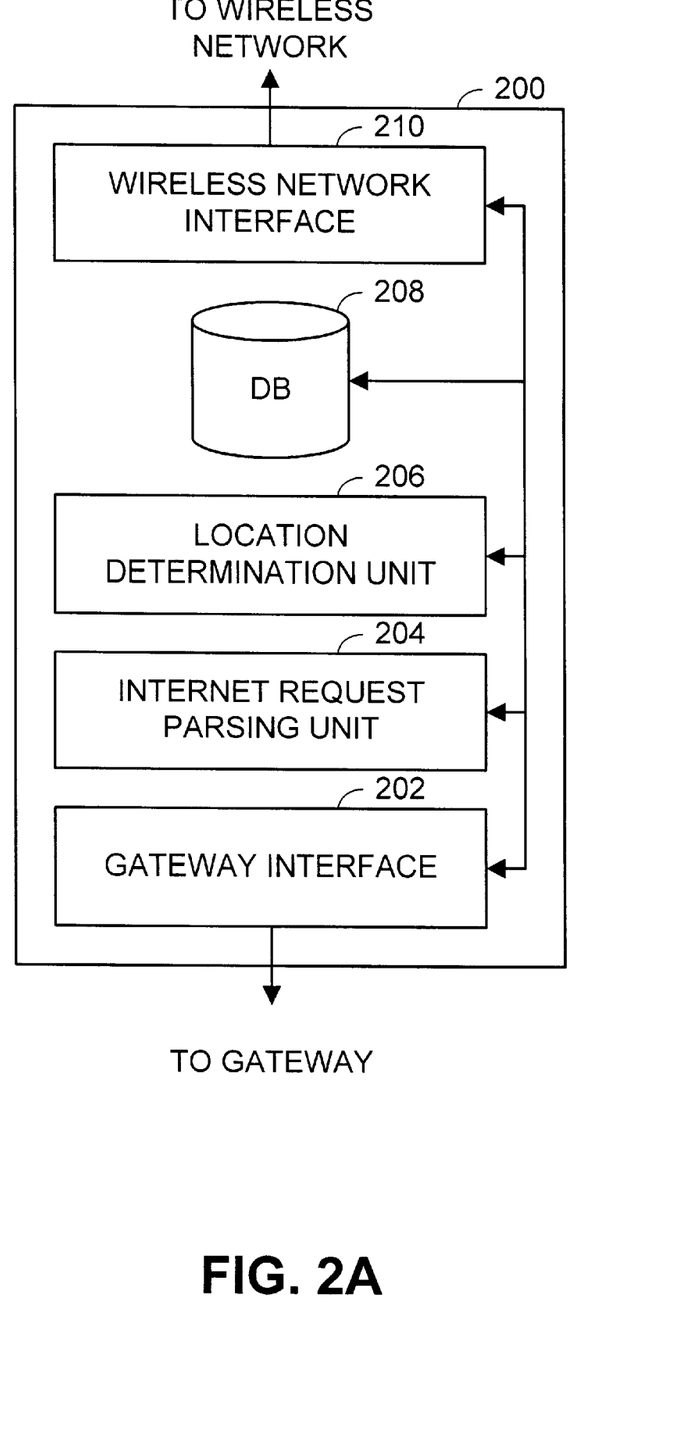
FIG. 2A is a block diagram illustrating construction of a location appending unit constructed according to the present invention.

FIG. 2A illustrates a location appending unit 200 constructed according to the present invention. The location appending unit includes a gateway interface 202, an Internet request parsing unit 204, a location determination unit 206, a database 208 and a wireless network interface 210. The components of the location appending unit 200 may include actual hardware components specifically constructed to perform the related operations or may comprise software elements running upon the already installed hardware within an associated gateway.

The gateway interface 202 couples to a gateway that interfaces the Internet to a wireless network. The Internet request parsing unit 204 monitors communications passing through the coupled gateway. Should any of the communications require to be appended with location information, the Internet request parsing unit 204 requests the location determination unit 206 to obtain location information respective to the communication and to append the location information to the communication.

The location determination unit 206, when seeking location information, communicates with the wireless network via the wireless network interface 210. The database 208 stores information required in operation of the location appending unit 200, cross-reference information and additional information as may be required or desirable, such as historical locations of mobile units. Upon a return of information from the wireless network respective to a mobile unit, the location determination unit 206 may access the database 208 to generate the location information to be appended. For example, if the required location information may include a zipcode. Thus, the location determination unit 206, having received longitude and latitude information, must determine the zipcode based upon the longitude and latitude information. Once the zipcode is determined, the location determination unit 206 appends the communication with the zipcode via the gateway interface 202.

Figure 2B:
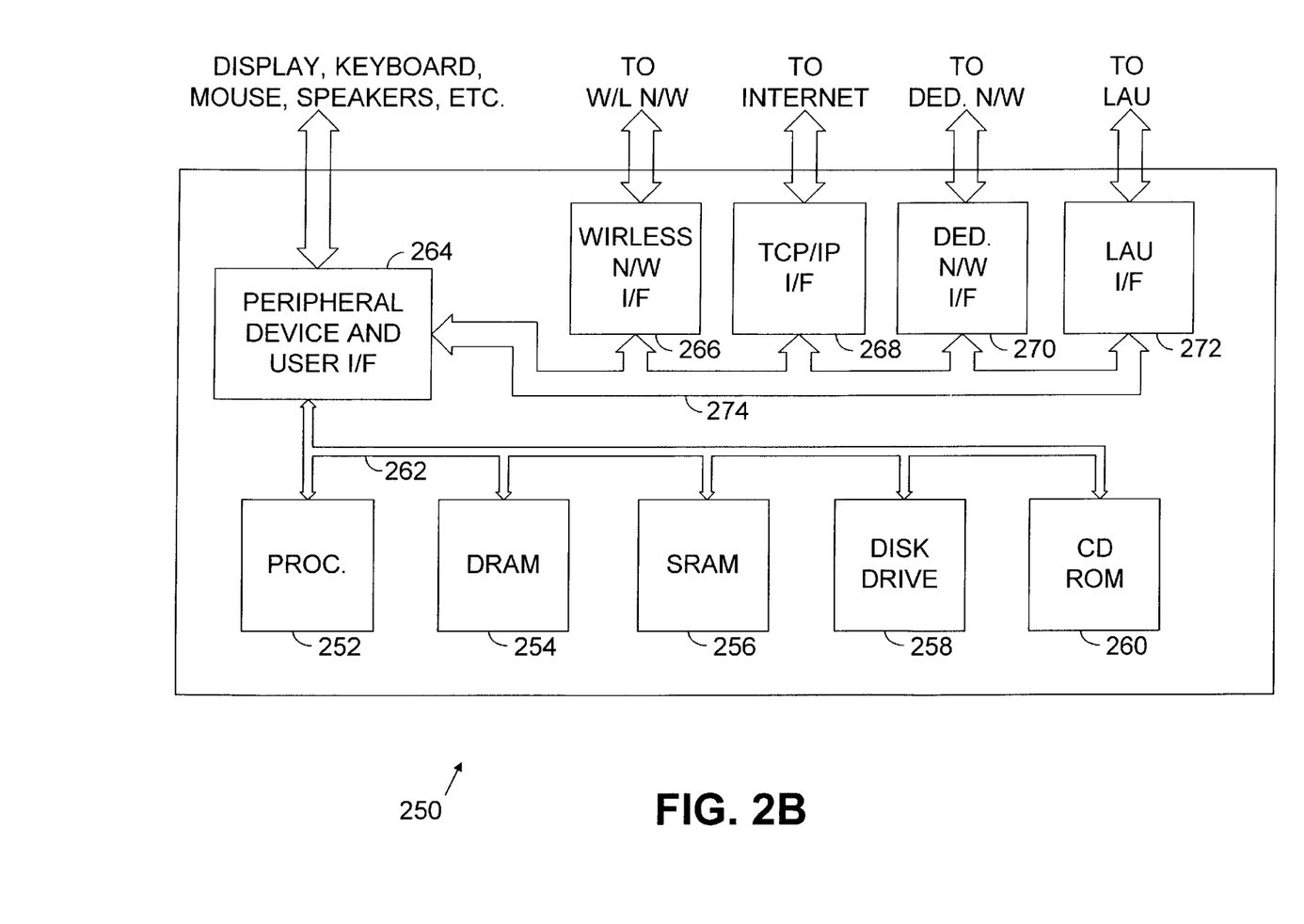
FIG. 2B is a block diagram illustrating construction of a gateway according to the present invention.

FIG. 2B illustrates a gateway 250 that executes operations according to the present invention using onboard hardware. The gateway 250 includes a processor 252, dynamic random access memory (DRAM) 254, static random access memory (SRAM) 256, a disk drive 258, and a CD ROM drive 260 coupled to a peripheral device and user interface 264 via bus 262. Processor 252, DRAM 254, SRAM 256, disk drive 258, and CD ROM 260 are generally known in the art. Thus, such components will not be further described herein except as to amplify upon the principles of the present invention.

The peripheral device and user interface 264 provides an interface between the processor bus 262 and the various components connected to a peripheral bus 274 as well as to user interface components such as display, keyboard, mouse, speakers, and other user interface devices. A wireless network interface 266, an Internet interface 268, a dedicated network interface 270 and a Public Switched Telephone Network (PSTN) interface 272 couple to the peripheral bus 274. Each of these interfaces 266 through 272 may comprise a peripheral component card coupled to a standardized peripheral bus 274. The wireless network interface 266 couples the gateway 250 to the wireless network 110 illustrated in FIG. 1A, for example. The Internet interface 268 couples the gateway 250 to the Internet 112 and operates according to the Internet protocols as previously described. The dedicated network interface 270 couples the gateway 250 to a proprietary network that may be employed to determine the location information. Finally, the optional PSTN interface 272 couples the gateway 250 to the PSTN.

When executing program instructions written according to the principles of the present invention, the gateway 250 provides an interface between the wireless network 110 and the Internet 112 illustrated in FIG. 1A. In providing the interface, the gateway 250 parses the communications received from the wireless network 110 and determines whether location information is to be appended to the communications. If so, the gateway 250, by executing specialized program instructions, determines the location information and ensures that the location information is present in a corresponding communication that is transmitted via the Internet 112 and that is based upon the communication. The program instructions executed by the gateway 250 may be written in any program language consistent supported by the gateway 250. Such programming languages are known in the art and will not further be described herein. As one will appreciate, program instructions that cause the gateway 250 to operate in a manner consistent with the present invention may be stored on the CD ROM 260, disk drive 258, SRAM 256, and/or DRAM 254.

Figure 3:
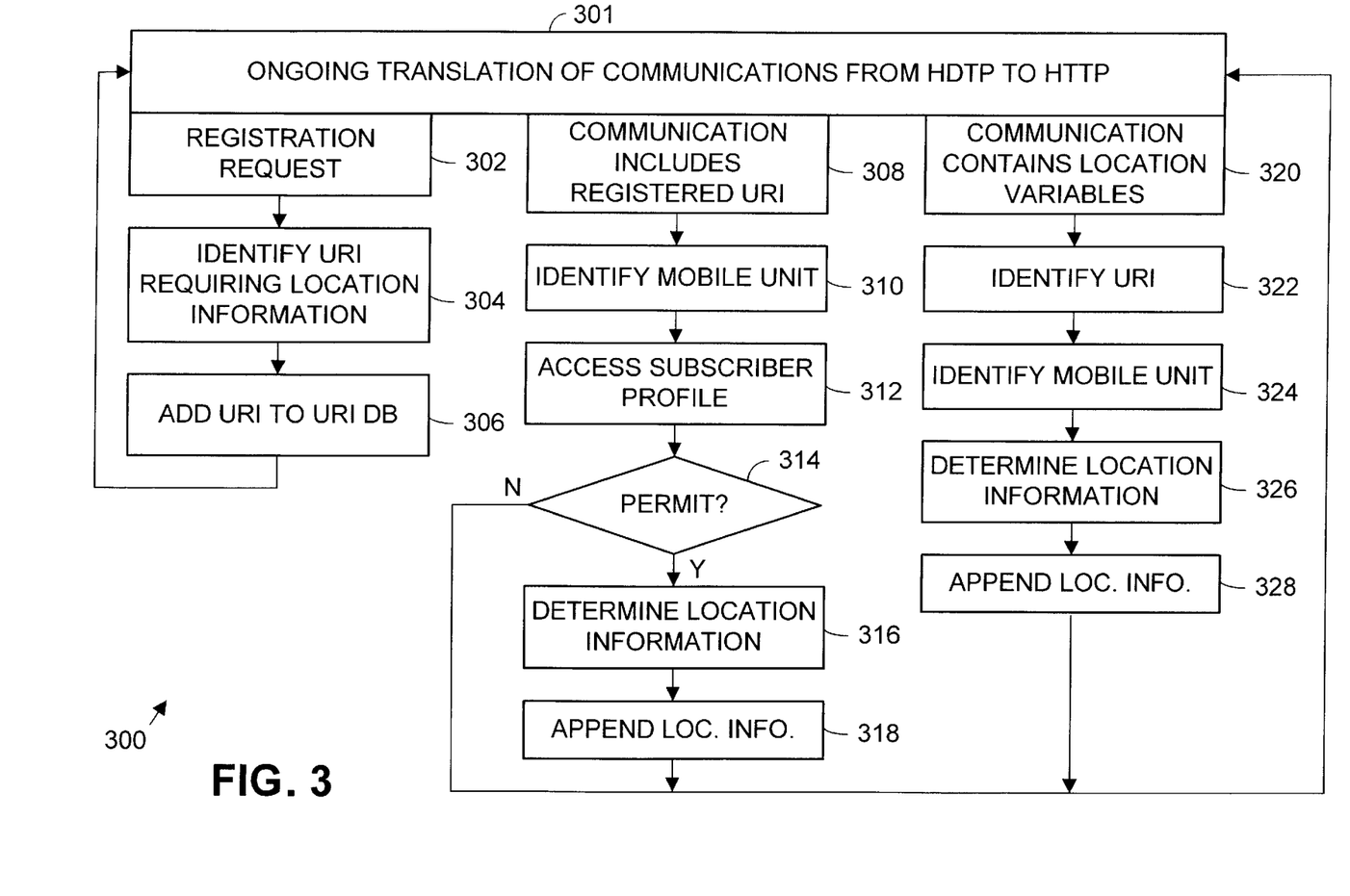
FIG. 3 is a flow diagram illustrating operation of a location appending unit constructed according to the present invention in conjunction with operation of a gateway.

FIG. 3 illustrates operation 300 of the location appending unit according to the present invention in conjunction with a gateway between the Internet and a wireless network. Operation commences at step 301 wherein the gateway performs ongoing translation of communications from the HDTP protocol to the HTTP protocol. From step 301, operation may proceed to step 302, 308 or 320.

Should an application request registration with the location appending unit, operation proceeds to step 302. Typical applications that request registration include mapping services, location sensitive billing information, yellow page services, travel services, weather services, and other applications to which the location of a client is of importance. These applications contact the location appending unit via the gateway to request that a specific URI be registered. Typically, the URI corresponds to a web page present on an Internet server upon which the application resides. During normal operation, a wireless network client typically either requests information from the Internet server application or posts information to the Internet server application. In order to ensure that location information desired by the application is appended receive the location information, the application first registers with the location appending unit. After requesting registration, the application identifies the URI requiring location information at step 304. Once the request is received, the location appending unit adds the URI to a URI database present in the location appending unit which is thereafter used in parsing communications passing through a coupled gateway.

Operation proceeds from step 301 to step 308 when a communication is parsed that includes a registered URI. Once determination is made at step 308, the mobile unit that has transmitted the communication is identified at step 310. The mobile unit may be identified in differing ways, depending upon the content of the communication or the address of the mobile unit, should such address be received with the communication. A mobile identification number (MIN), an International Mobile Subscriber Identity (IMSI), a dialed number, IP address or URI may be present in the communication which identifies the mobile unit. This information is then used to identify the mobile unit in subsequent accessing of the wireless network.

From step 310, operation proceeds to step 312 wherein the mobile unit's subscriber profile is accessed. The mobile unit's subscriber profile, if not stored locally, is accessed via the wireless network. Should the subscriber profile allow location information to be appended to a communication, the location for the mobile unit is determined at step 316 and then appended to the communication at step 318. However, if at step 314, it is determined that permission to post location information for the mobile unit is denied, operation returns to step 301.

If it is determined that the communication contains location variables at step 320, operation proceeds to step 322 wherein the URI for the communication is identified. Then, the identity of the mobile unit is determined at step 324. Based upon the identification of the mobile unit, the mobile unit's location is then determined at step 326 and the location information is appended to the communication at step 328. From step 328, operation returns to step 301.

Figure 4:
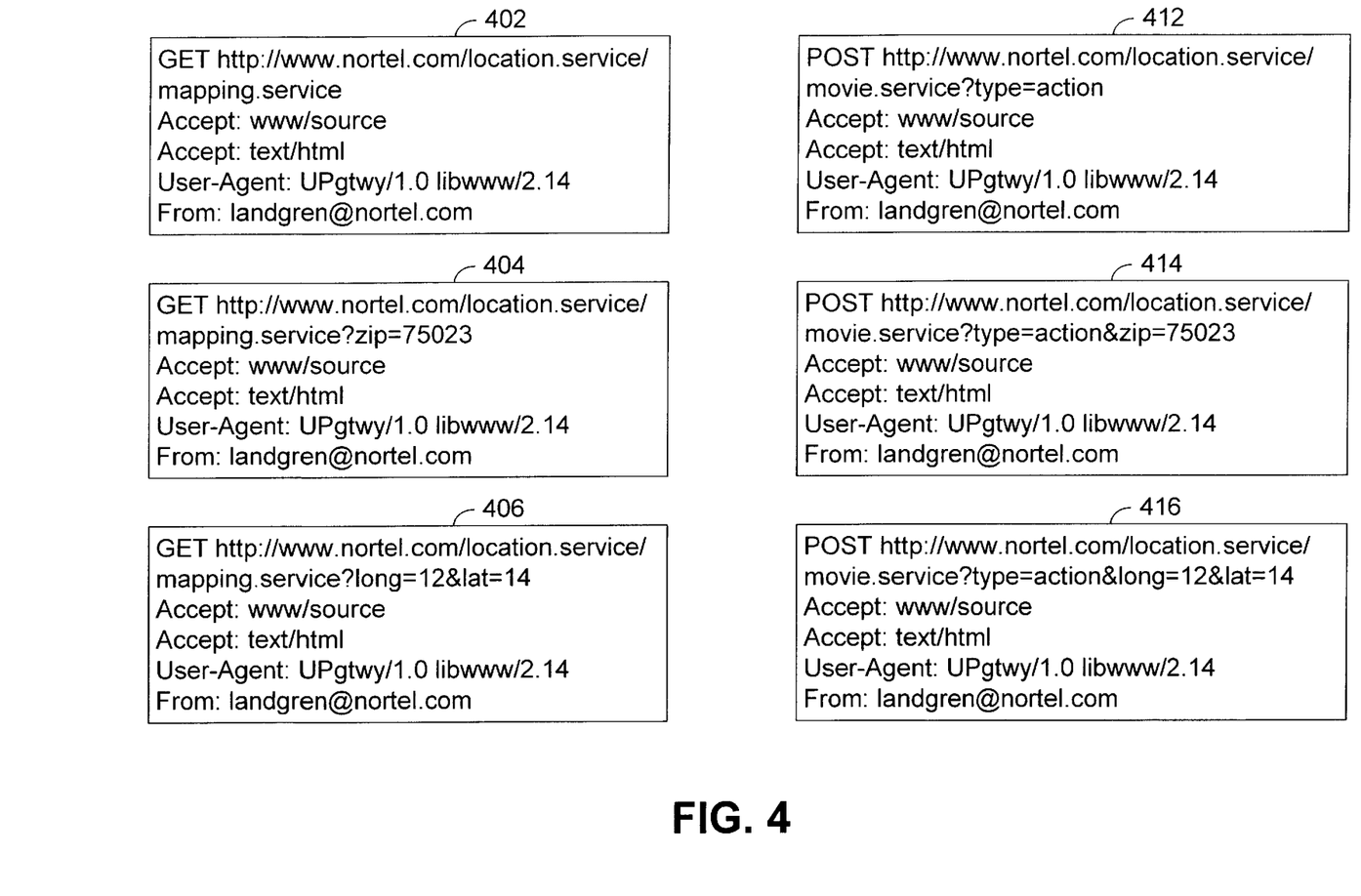
FIG. 4 is a diagram illustrating a communication in the form of an HTTP transfer from a mobile unit to an Internet server prior to operation of the location appending unit and after operation of the location appending unit wherein location information is appended to the communication.

FIG. 4 illustrates HDTP communications that are received by the gateway, parsed by the location appending unit and to which location information is appended. HDTP/HTTP methods include .OPTIONS, .GET, .HEAD, .POST, .PUT, .DELETE and .TRACE methods, among others. Illustrated in FIG. 4 are communications which include the .GET and .POST HDTP/HTTP methods. While the .GET method requests the information identified by the corresponding URI, the .POST method requests that information contained in the communication be posted to the URI.

Block 402 is a communication sent from a mobile unit operating within a wireless network and intended for a web server having the URI "http:/www.nortel.com/location.service/" using the .GET HDTP/HTTP method. Lines of the communication include "mapping.service", "Accept: www/source", "Accept: text/html", "User-Agent: UPgtwy/1.0 libwww/2.14" and indicating the communication is From: landgren@nortel.com. Thus, the information requested by the communication 412 requires that the current location of the mobile unit be identified in the communication.

In operation of the location appending unit, the gateway interface monitors the communication as it passes the gateway, passing the information to the Internet request parsing unit. The Internet request parsing unit identifies the URI "http:/www.nortel.com/location.service/" as having been previously registered and requiring location information. Based upon the identity of the sending unit, landgren@nortel.com, the location appending unit first determines the identity of the mobile unit. Typically, the identity of the mobile unit is contained within the communication. Then, the location appending unit determines the location of the mobile unit, either determining the longitude and latitude of the mobile unit or the zipcode within which the mobile unit reside. The location appending unit then appends the communication with the location information. Reference numeral 404 identifies the communication to which zipcode location information has been amended while reference numeral 406 identifies the communication to which longitude and latitude information has been appended.

FIG. 4 also illustrates a communication 412 within which a .POST HDTP/HTTP method line is included. As contrasted to the .GET method of communication 402, communication 412 includes information that will be posted to the identified URI. However, the information to be posted requires location information respective to the mobile unit that sent the communication 412. Upon identifying the "movie.service?type=action" line, the location appending unit determines that location information for the mobile unit should be appended. Thus, as shown in blocks 414 and 416, the location appending unit determines the location of the client, landgren@nortel.com, and appends the zipcode and the longitude and latitude for the mobile unit, respectively.

Figure 5:
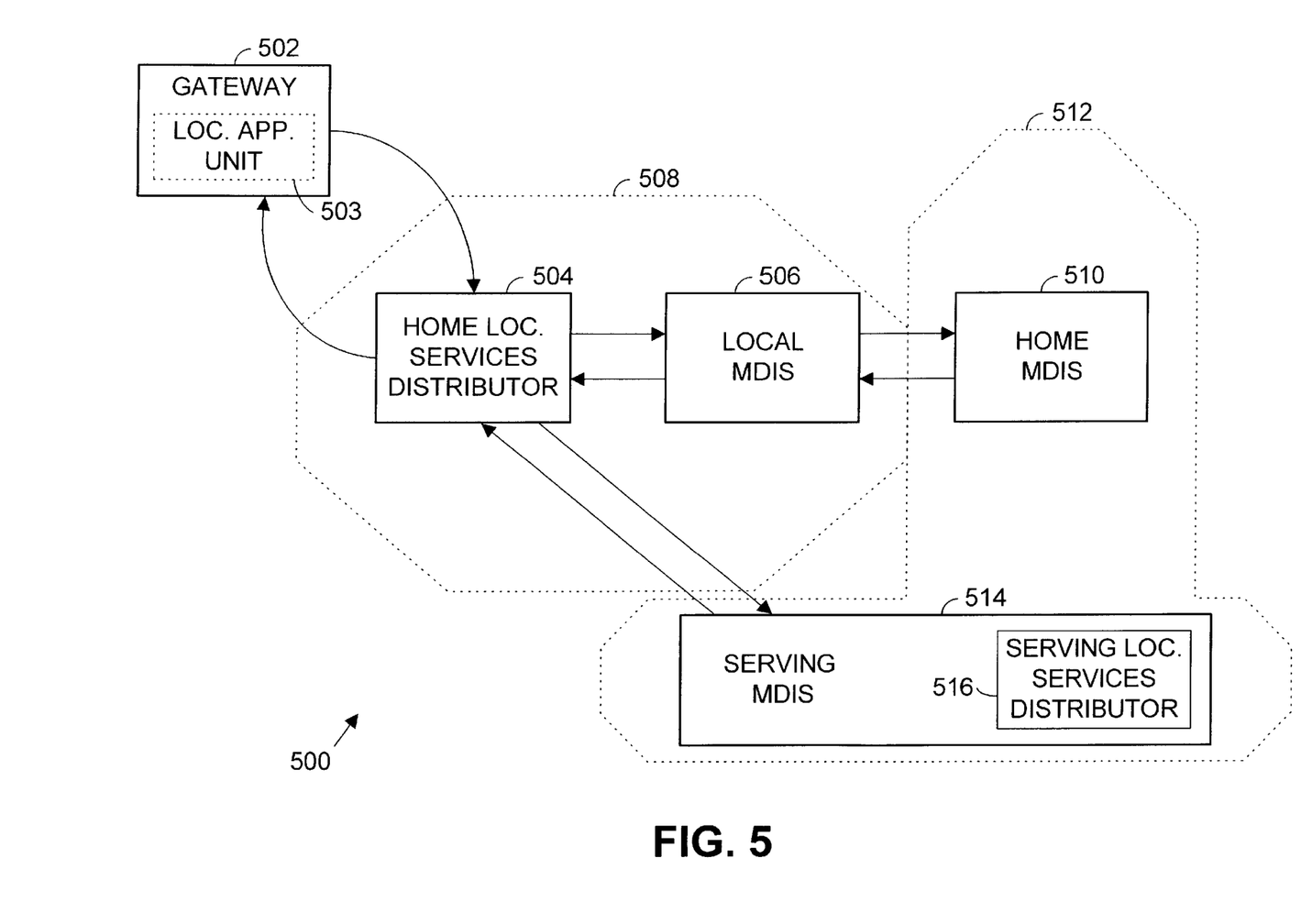
FIG. 5 is a diagram illustrating a wireless network constructed according to the cellular digital packet data (CDPD) architecture that operates in conjunction with a location appending unit constructed according to the present invention to append location information to communications originating from mobile units intended for Internet servers.

FIG. 5 illustrates a portion of a CDPD network 500 within which a location appending unit 505 operates. CDPD is an open standard that allows mobile devices to be directly accessible without requiring special applications, programming interfaces, or gateways. A CDPD Network is a peer multi-protocol, connectionless network that may share unused channels in existing Advanced Mobile Phone Systems (AMPS) to provide a 19.2 kbps data channel. The CDPD network 500 includes a Home Location Services Distributor (HLSD) 504 and a local Mobile Data Intermediate System (MDIS) 506 contained within a home operating area 508. The gateway 502 and location appending unit 503 access the HLSD 504 via an appropriate communication link. The CDPD network 500 also includes a visiting operating area 512 within which a home MDIS 510 and a serving MDIS 514 locate. The serving MDIS 514 includes a Serving Location Services Distributor (SLSD) 516.

Figure 6:
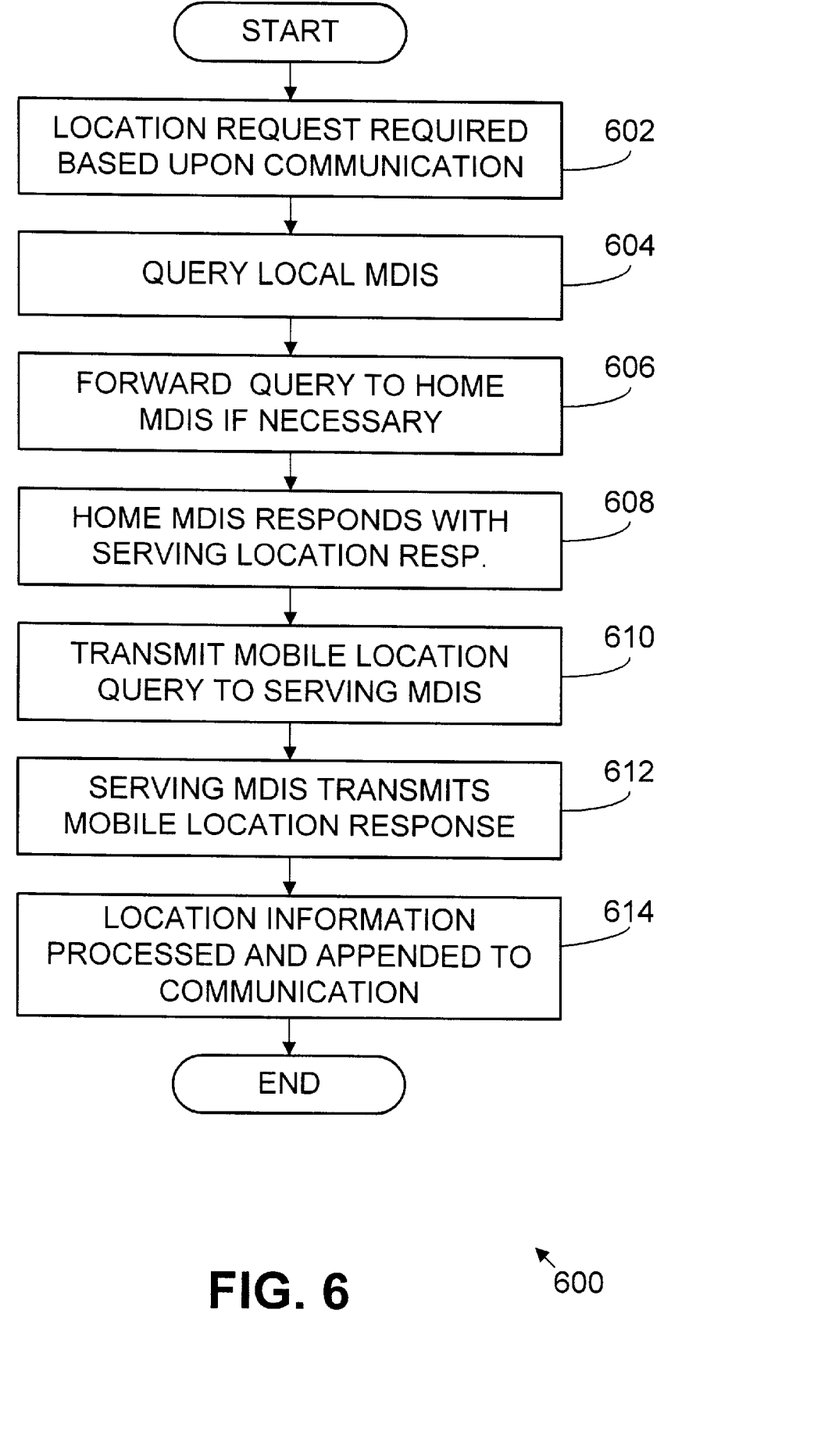
FIG. 6 is a logic diagram illustrating operation of a method of appending location information to a communication consistent with the wireless network of FIG. 5.

FIG. 6 illustrates operation 600 according to the present invention in conjunction with the CDPD network 500 of FIG. 5. Operation commences at step 602 wherein the location appending unit 503 determines that a location request is required based upon contents of a communication received by the gateway 502. Next, at step 604, the location appending unit 503 queries the local MDIS 506 with a serving location query. The local MDIS 506 then forwards the query to the home MDIS 510, if required, at step 606. The serving location query includes a message including, for example, a message type, a sequence number, the mobile end system (M-ES) address length and the M-ES address.

At step 608, the home MDIS 510 responds with a serving location response. The serving location response includes, for example, a message type, a sequence number, the M-ES address length, the M-ES address, a location update address length and the location update address. Based upon this information, the HLSD 504 transmits a mobile location query to the serving MDIS 514 at step 610. The mobile location query includes, for example, a message type, a sequence number, the M-ES address length and the M-ES address. At step 612, the serving MDIS 514, in conjunction with the included SLSD 516, responds with a mobile location response. The mobile location response includes, for example, a message type, a sequence number, the M-ES address length, the M-ES address, Position: LatLong, Position: Cell Angle and Position: Cell Radius. The location information is then processed by the location appending unit 503 and appended to the communication that caused initiation of the location determination.

Figure 7:
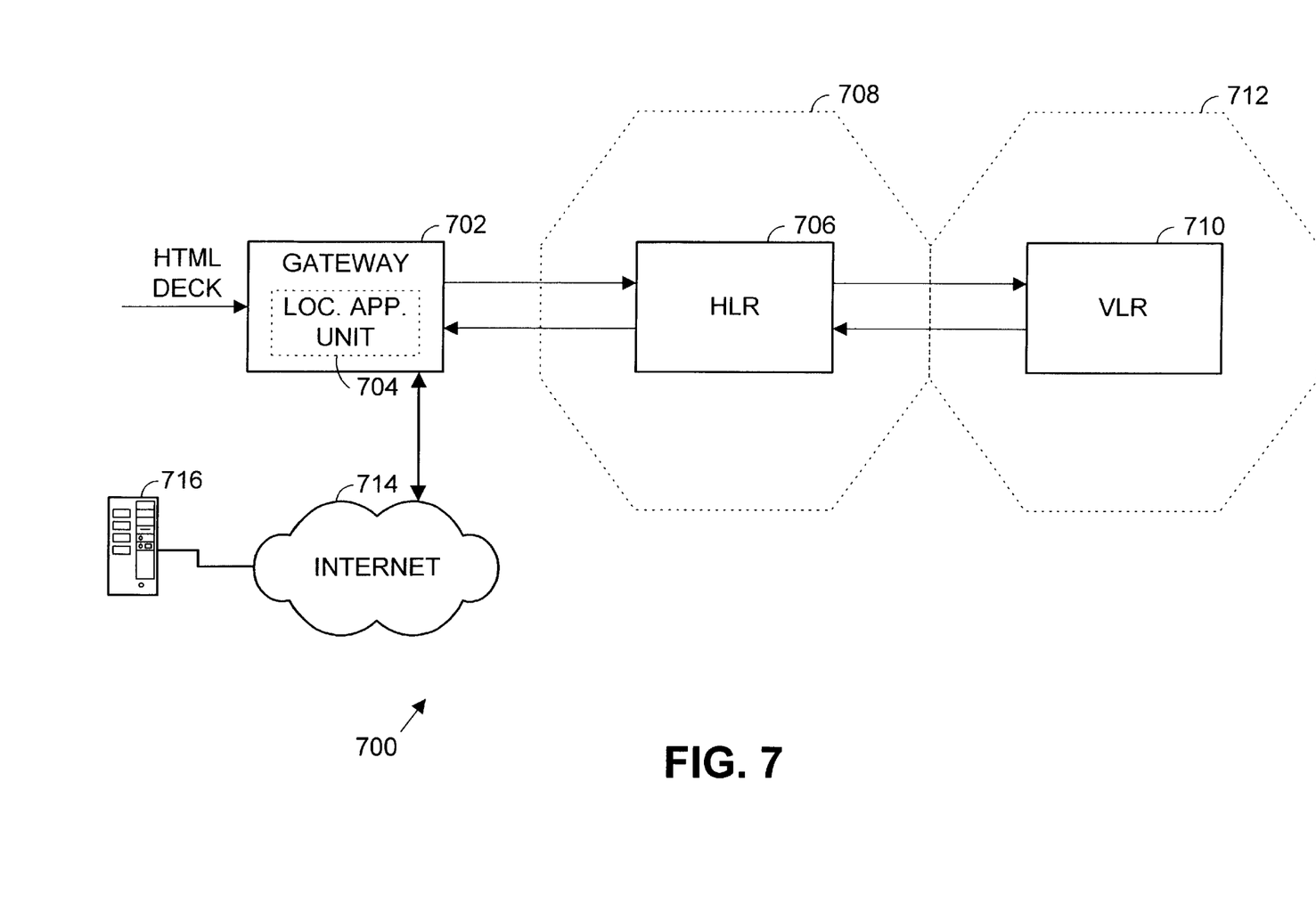
FIG. 7 is a diagram illustrating a wireless network constructed according to the Global System for Mobile communications (GSM) or North American Cellular (NAM) architecture that operates with a location appending system constructed according to the present invention.

FIG. 7 illustrates an installation 700 of a location appending unit 704 constructed according to the present invention. As shown, the location appending unit 704 resides within a gateway 702 that provides an interface between a wireless network and the Internet 714. The wireless network includes two service areas, a first service area 708 served by a first operator and a second service area 712 served by a second operator, each of which operates according to the GSM or NAM standards.

Connected to the Internet 714 is a web server 716 that runs web based applications and interfaces with a mobile unit operating in service area 712. The mobile unit is served by a home location register (HLR) 706 within its home service area 708 and a visitor location register (VLR) 710 within the service area 712 which it is visiting In exchanging communications with the web server 716, the mobile unit transmits communications via the wireless network to the gateway 702 which converts the communications from the HDTP protocol to the HTTP protocol and forwards the communications to the web server 716 via the Internet 714. In converting the communications, the location appending unit 704 in the gateway 704 may determine and append location information to the communications.

Figure 8:
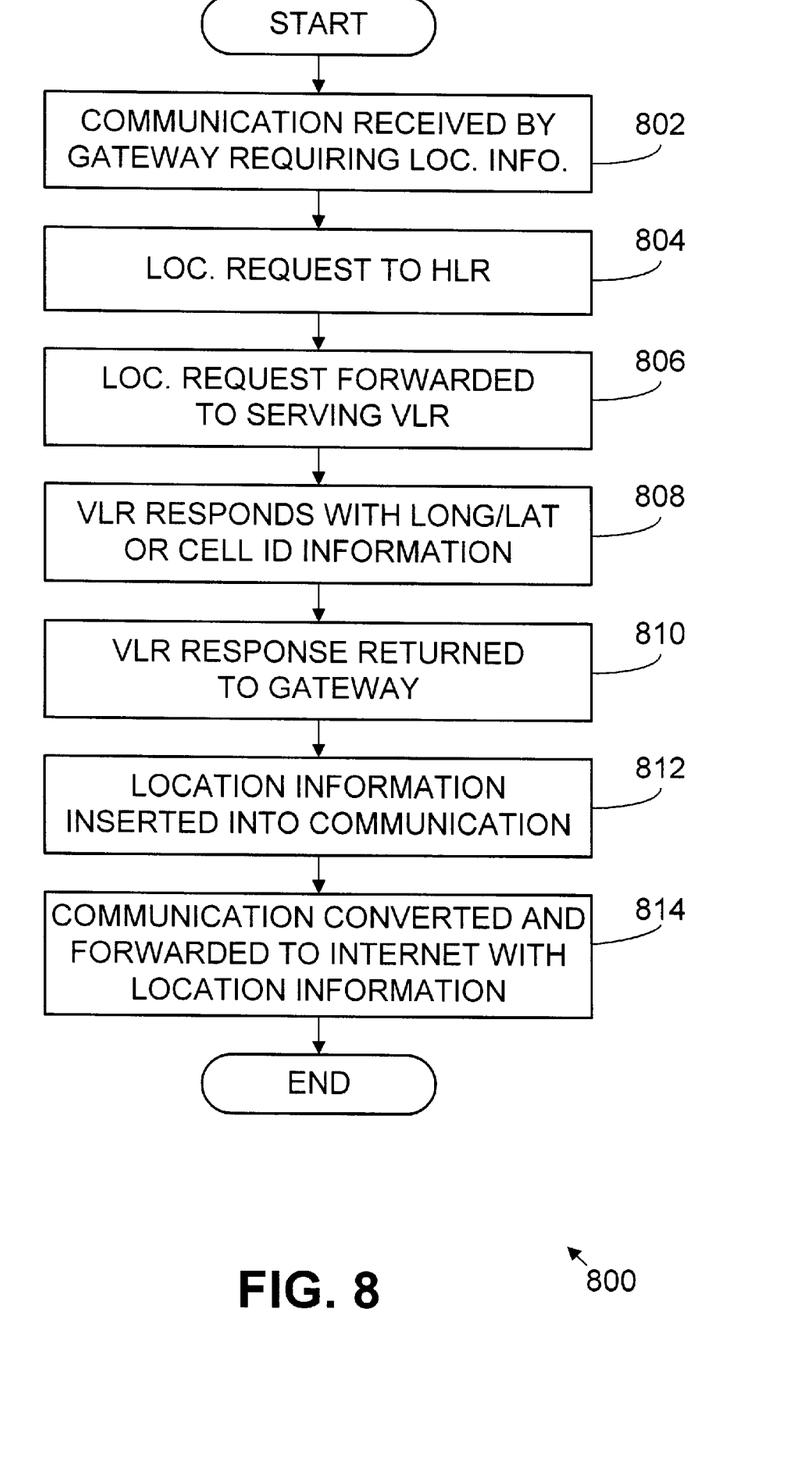
FIG. 8 is a logic diagram illustrating operation of a method of appending location information to a communication consistent with the wireless network of FIG. 7.

FIG. 8 illustrates operation of the location appending unit 704 of FIG. 7. Operation commences at step 802 wherein the gateway receives a communication that requires location information. Upon making the determination, the location appending unit 704 first identifies the mobile unit that transmitted the communication and then sends a locate request type query to the HLR 706 at step 804. Should the mobile unit be visiting service area 712, which it is in the discussion with respect to FIG. 7, the HLR 706 forwards the locate request type query to VLR 710 at step 806. Then, at step 808, the VLR 710 responds to the locate request type query with longitude and latitude information or cell ID information for the mobile unit identified in the request. The longitude and latitude information may be specific to the mobile unit or to the BTS serving the cell within which the mobile unit resides. The HLR 706 forwards the response to the gateway 702 at step 810. At this point, the location appending unit may convert the longitude and latitude information into a zipcode should a zipcode be required in the communication. Then, at step 812, the location appending unit 704 places the location information into the communication. Finally, at step 814, the gateway 702 converts the communication from HDTP to HTTP forwards the communication to the web server 716 via the Internet 714.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A location appending system that produces physical location information that is entered in a communication passing through a gateway from a wireless network to the Internet, the physical location information indicating a physical location of a mobile unit operating within the wireless network that sent the communication, the system comprising:
   a gateway interface that couples to the gateway;
   an Internet request parsing unit coupled to the gateway interface that parses communications passing through the gateway from the wireless network to the Internet and that determines that physical location information for the mobile unit should be entered in a particular communication sent by the mobile unit;
   a location determination unit that produces a locate request for the mobile unit based upon a determination from the Internet request parsing unit that physical location information is required for the mobile unit;
   a wireless network interface coupled to the location determination unit and the wireless network that forwards the locate request to the wireless network and that receives a locate response from the wireless network, the locate response indicating the physical location of the mobile unit; and
   the location determination unit determining the physical location information based upon the locate response and entering the physical location information in the communication.

2. The location appending system of claim 1, wherein the wireless network operates compliant with the Cellular Digital Packet Data standard.

3. The location appending system of claim 2, wherein the wireless network includes:
   a home location services distributor;
   at least one home Mobile Data Intermediate System;
   at least one serving Mobile Data Intermediate System; and
   a serving location services distributor, which together respond to the locate request.

4. The location appending system of claim 1, wherein the wireless network operates compliant with a communication standard selected from the group consisting of the Global System for Mobile communications standard and the North American communication standard.

5. The location appending system of claim 4, wherein the wireless network includes:
   a home location register; and
   at least one visitor location register, which together respond to the locate request.

6. The location appending system of claim 1, further comprising a database coupled to the location determination unit that contains cross-reference information used by the location determination unit in determining the physical location information.

7. The location appending system of claim 1, wherein the physical location information comprises a zipcode corresponding to a current location of the mobile unit.

8. The location appending system of claim 1, wherein the physical location information comprises longitude and latitude information corresponding to a current location of the mobile unit.

9. The location appending system of claim 1, wherein the communication comprises a markup language communication.

10. The location appending system of claim 1, wherein the location determination unit enters the physical location information in the communication by replacing a portion of the communication with the location information.

11. The location appending system of claim 1, wherein the location determination unit forwards the physical location information to the gateway which appends the physical location information to the communication.

12. A gateway that services communications passing between a wireless network and the Internet, the gateway comprising:
   a link coupled between the wireless network and the Internet that includes a wireless network side and an Internet side, the link converting communications passing between the wireless network and the Internet;
   a location appending system comprising:
      a gateway interface that couples to the link;
      an Internet request parsing unit coupled to the link that parses communications passing through the gateway from the wireless network to the Internet and that determines that physical location information should be entered in a communication sent by a mobile unit;
      a location determination unit that produces a locate request for the mobile unit based upon a determination from the Internet request parsing unit that physical location information is required for the mobile unit;
      a wireless network interface coupled to the location determination unit and the wireless network that forwards the locate request to the wireless network and that receives a locate response from the wireless network, the locate response indicating the physical location of the mobile unit; and
      the location determination unit determining the physical location information based upon the locate response; and
   the link entering the physical location information in the communication.

13. The gateway of claim 12, wherein the wireless network operates compliant with the Cellular Digital Packet Data standard.

14. The gateway of claim 13, wherein the wireless network includes:
   a home location services distributor;
   at least one home Mobile Data Intermediate System;
   at least one serving Mobile Data Intermediate System; and
   a serving location services distributor, which together respond to the locate request.

15. The gateway of claim 12, wherein the wireless network operates a communication standard selected from the group consisting of the Global System for Mobile communications standard and the North American communication standard.

16. The gateway of claim 15, wherein the wireless network includes:
   a home location register; and
   at least one visitor location register, which together respond to the locate request.

17. The gateway of claim 12, wherein the location appending system further comprises a database coupled to the location determination unit that contains cross-reference information used by the location determination unit in determining the physical location information.

18. The gateway of claim 12, wherein the physical location information comprises a zipcode corresponding to a current location of the mobile unit.

19. The gateway of claim 12, wherein the physical location information comprises longitude and latitude information corresponding to a current location of the mobile unit.

20. The gateway of claim 12, wherein the communication comprises markup language.

21. A method of appending physical location information to a communication passing through a gateway between a wireless network and the Internet, the physical location information indicating a physical location of a mobile unit operating within the wireless network that sent the communication, the method comprising:
   receiving communications from the wireless network;
   parsing the communications to determine that a communication sent by a mobile unit requires physical location information to be entered;
   identifying the mobile unit that sent the communication;
   producing a locate request that requests a physical location for the mobile unit;
   forwarding the locate request to the wireless network;
   receiving a locate response from the network, the locate response indicating the physical location of the mobile unit;
   determining the physical location information based upon the locate response; and
   entering the physical location information in the communication.

22. The method of claim 21, wherein the communication comprises markup language.

23. The method of claim 22, further comprising converting the communication from the Handheld Device Transfer Protocol to the Hypertext Transfer Protocol.

24. The method of claim 21, further comprising:
   accessing a database coupled to the location determination unit that contains cross-reference information; and
   determining the physical location information based upon the locate response and the cross-reference information.

25. The method of claim 21, wherein the physical location information comprises a zipcode corresponding to a current location of the mobile unit.

26. The method of claim 21, wherein the physical location information comprises longitude and latitude information corresponding to a current location of the mobile unit.

27. The method of claim 21, wherein the wireless network operates compliant with the Cellular Digital Packet Data standard.

28. The method of claim 21, wherein the wireless network operates compliant with the Global System for Mobile communications standard.

29. A computer readable medium containing program instructions that, when executed by a computer, cause the computer to enter physical location information in a communication passing through a gateway between a wireless network and the Internet, the physical location information indicating a physical location of a mobile unit operating within the wireless network that sent the communication, the computer readable medium comprising:
   a first plurality of stored instructions that cause the computer to receive communications from the wireless network;
   a second plurality of stored instructions that cause the computer to parse the communications to determine that a communication sent by a mobile unit requires physical location information to be entered;
   a third plurality of stored instructions that cause the computer to identify a mobile unit that transmitted the communication;
   a fourth plurality of stored instructions that cause the computer to produce a locate request that requests a physical location for the mobile unit;
   a fifth plurality of stored instructions that cause the computer to forward the locate request to the wireless network;
   a sixth plurality of stored instructions that cause the computer to receive a locate response from the network, the locate response indicating the physical location of the mobile unit;
   a seventh plurality of stored instructions that cause the computer to determine the physical location information based upon the locate response; and
   an eighth plurality of stored instructions that cause the computer to enter the physical location information in the communication.

30. The computer readable medium of claim 29, further comprising:
   a ninth plurality of stored instructions that cause the computer to access a database that contains cross-reference information; and
   a tenth plurality of stored instructions that cause the computer to determine the physical location information based upon the locate response and the cross-reference information.

31. The computer readable medium of claim 29, wherein the physical location information comprises a code corresponding to a current location of the mobile unit.

32. The computer readable medium of claim 29, wherein the physical location information comprises longitude and latitude information corresponding to a current location of the mobile unit.

33. The computer readable medium of claim 29, wherein the wireless network operates compliant with the Cellular Digital Packet Data standard.

34. The computer readable medium of claim 29, wherein the wireless network operates compliant with the Global System for Mobile communications standard.

35. The computer readable medium of claim 29, wherein the communication comprises a markup language.

36. The computer readable medium of claim 35, further comprising a plurality of instructions that cause the computer to convert the communication from the Handheld Device Transfer Protocol to the Hypertext Transfer Protocol.

* * * * *